June 21, 1927.

W. J. BRYAN

CHAIN LINK

Filed May 25, 1926

1,633,434

WITNESSES

INVENTOR
Wm. J. Bryan,
BY
ATTORNEYS

Patented June 21, 1927.

1,633,434

UNITED STATES PATENT OFFICE.

WILLIAM J. BRYAN, OF JERSEY CITY, NEW JERSEY.

CHAIN LINK.

Application filed May 25, 1926. Serial No. 111,613.

The present invention is concerned with improvements in chain links, particularly to a chain link which is adapted for attaching a chain to an adjacent chain or some similar anchoring means.

The invention finds its preferred embodiment in an end link for the cross tread members of tire chains.

These links as conventionally constructed are of general U-shape engaging at their intermediate portions one of the links of the cross tread chain and formed at their ends with a pair of turned over hooks, the bills of which are spaced from the shanks a sufficient distance to permit the entrance under the bills of one of the links of the annular anchoring chain. The ordinary operation of attaching the cross tread members is to hook the end link of the cross tread into one of the links of the anchoring chain, and then force the bills of the hooks downwardly by applying a suitable bending tool. This operation not only renders it awkward to attach the cross tread members, but frequently renders it very difficult to remove them for purposes of replacement or repair.

A specific object of the present invention is to overcome the above noted disadvantages, and to provide an end link for cross treads which may be attached to, or removed from its anchoring chain without the use of tools, without loss of time, and which may be so attached that there is no danger of the cross tread becoming disengaged from its anchoring chain, either when the chains are in place on a wheel, or when the chains are stored and piled carelessly on the floor, or in some storage container.

A further object of the invention is to provide a chain link of the character above noted, which will be of simple, practical construction, which will be rugged, durable and efficient in use, which may be manufactured with comparative economy, and which may be readily used with any conventional type of tire chain now on the market.

With the above noted and other objects in view, the invention consists in certain novel features of construction, and combinations and arangements of parts, as will be more fully hereinafter set forth and pointed out in the claims. The invention may be more fully understood from the following description in connection with the accompanying drawings, wherein—

Figure 1:
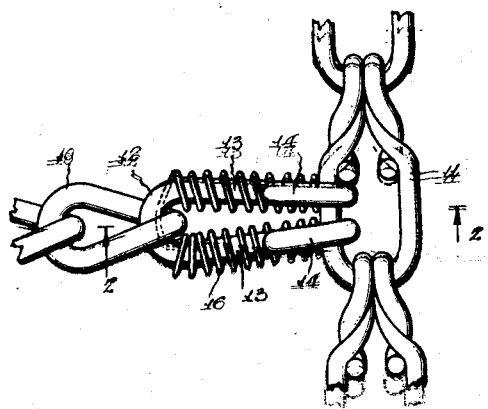
Fig. 1 is a fragmentary plan view showing a cross tread chain attached to an anchoring chain by the use of one of my improved links.

In the drawings I have used the reference character 10 to designate one of the links of a cross tread chain, the reference character 11 to designate one of the links of an annular chain to which the cross tread is attached, and the reference character 12 to indicate generally the attaching end link of the present invention.

This link in its general formation corresponds closely to the end links now commonly employed. It has its intermediate portion engaged with the link 10 of the cross tread, and is bent to define a pair of elongated converging shanks 13 terminating in hook portions 14, the bills 15 of which are reversely bent back towards the shanks and teminate a sufficient distance from the shank to permit the insertion of the link 11 under the hooks.

Instead of bending the bills of the hooks down to secure the link 11 however, I make use of a coiled expansion spring 16 encircling the shanks 13 and acting by its own inherent resiliency to maintain its ends pressed inwardly under the hooks 14.

Figure 2:
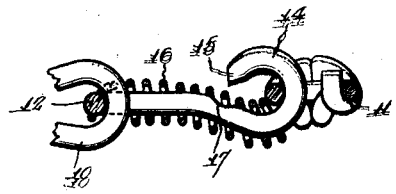
Fig. 2 is a sectional detail on the line 2—2 of Fig. 1.
Figure 3:
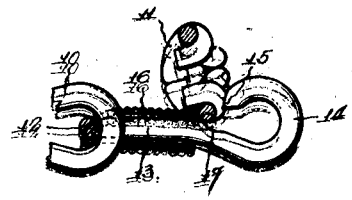
Fig. 3 is a view similar to Fig. 2, but showing the relative position of the end link and anchoring chain as the chain is being removed or replaced.

This spring reduces the space between the bills 15 of the hooks and the shanks 13 to such an extent that the link 11 may no longer be passed through the space. In order to enter the link, it is necessary that the two springs 16, or the ends of the spring 16 be manually retracted to the position shown in Fig. 3, at which time the link 11 may be freely entered into or removed from the hooks 14. After the link 11 has been inserted under the hooks, the spring 16 will assume the position shown in Fig. 2, and effectively block the retraction of the link 11.

In order to make absolutely sure that the link 11 cannot accidentally force the springs back, or work between the convolutions of the spring and become displaced, I preferably advance the bills 15 of the hooks a little closer than is customary to the shanks of the hooks, and notch or recess the shanks 13 as indicated at 17 to compensate for such advance. While the drawings do not attempt to be exact in this particular, it is noted that the distance between the bill of the hook and the notch 17 should be just about enough to permit the link 11 to be inserted. Thus, when the cross tread member is attached to its anchoring chain, the parts will assume approximately the position shown in Fig. 2, and one or more convolutions of the spring 16 will seat in the recesses 17 and block retractile movement of the links 11.

While I have shown the link of the present invention as embodied in a cross tread member for tire chains, it is to be understood that it may have a wide range of utility in the arts, also various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. A link of the class described including a length of metal bent into approximately U-shape to define a pair of converging shanks, the ends of the shanks being reversely bent upon themselves to form hooks, and a coiled expansion spring encircling the shanks and having its ends disposed under the hooks.

2. A link of the class described including a length of metal bent into approximately U-shape to define a pair of converging shanks, the ends of the shanks being reversely bent upon themselves to form hooks, and a coiled expansion spring encircling the shanks and having its ends disposed under the hooks, the bills of the hooks being spaced from the shanks just far enough to permit the insertion of an element to be attached under the hooks when the spring ends are manually retracted.

3. A link of the class described including a length of metal bent into approximately U-shape to define a pair of converging shanks, the ends of the shanks being reversely bent upon themselves to form hooks, and a coiled expansion spring encircling the shanks and having its ends disposed under the hooks, said shanks being notched under the bills of the hooks and the space between the bottom, said notches and the bills of the hooks being just wide enough to permit the entrance of a chain link when the spring ends are retracted.

4. A link of the class described including a length of metal bent into approximately U-shape to define a pair of converging shanks, the ends of the shanks being reversely bent upon themselves to form hooks, and a coiled expansion spring encircling the shanks and having its ends disposed under the hooks, said shanks being notched under the bills of the hooks and the space between the bottom, said notches and the bills of the hooks being just wide enough to permit the entrance of a chain link when the spring ends are retracted, one of the convolutions of each end of the spring normally lying in the notch to prevent accidental disengagement of the link and the member to which it is attached.

WILLIAM J. BRYAN.